United States Patent [19]

Mahmoodi et al.

[11] Patent Number: 5,164,906
[45] Date of Patent: Nov. 17, 1992

[54] SUBMODULE FEEDER ARRANGEMENT FOR AN INSERTER

[75] Inventors: Susan Mahmoodi, Southbury; Joseph H. Marzullo, Brookfield; Mark A. Scribe, Southbury, all of Conn.

[73] Assignee: Pitney Bowes Inc., Stamford, Conn.

[21] Appl. No.: 616,263

[22] Filed: Nov. 20, 1990

[51] Int. Cl.⁵ .............................. G06F 15/46
[52] U.S. Cl. .......................... 364/478; 271/9
[58] Field of Search ............ 364/478, 131, 471; 271/8.1, 9

[56] References Cited

U.S. PATENT DOCUMENTS

| | | | |
|---|---|---|---|
| 3,193,279 | 7/1965 | Cambell | 270/58 |
| 3,806,111 | 4/1974 | Lachman et al. | 270/54 |
| 3,809,385 | 5/1974 | Rana | 270/54 |
| 3,881,717 | 5/1975 | Dean | 270/58 |
| 3,884,458 | 5/1975 | Ryland | 270/58 |
| 4,664,546 | 5/1987 | Runzi | 400/204 |
| 4,671,686 | 6/1987 | Howes et al. | 400/605 |
| 4,691,910 | 9/1987 | Cargill et al. | 271/3 |
| 4,691,911 | 9/1987 | Nakagawa | 271/9 |
| 4,728,095 | 3/1988 | Irvine et al. | 271/124 |
| 4,729,680 | 3/1988 | Osterlund | 400/624 |
| 4,729,683 | 3/1988 | Staniszewski | 400/624 |
| 4,849,790 | 7/1989 | Ito | 355/321 |
| 4,869,712 | 9/1989 | Ishino | 493/416 |
| 4,942,535 | 7/1990 | Francisco | 364/478 |
| 4,970,654 | 11/1990 | Francisco | 364/478 |
| 4,992,950 | 2/1991 | Francisco | 364/478 |
| 5,003,485 | 3/1991 | Francisco | 364/478 |

FOREIGN PATENT DOCUMENTS 90972 5/1983 Japan .

Primary Examiner—Jerry Smith
Assistant Examiner—Paul Gordon
Attorney, Agent, or Firm—Charles R. Malandra, Jr.; Melvin J. Scolnick

[57] ABSTRACT

An improvement to a modular inserter system that provides customized inserter machines which are configured by combining a plurality of modules, including a variety of module types, for example, feeder, folder and insertion modules, each module containing a microprocessor for controlling the module as part of the control system for the customized inserter machine. The improvement comprises a first upstream module of the inserter machine and a submodule feeder including structure for coupling the submodule feeder to the upstream end of the first upstream module. The submodule feeder performs operations of a feeder module under the control of the microprocessor of the first upstream module.

9 Claims, 4 Drawing Sheets

SUBMODULE FEEDER ARRANGEMENT FOR AN INSERTER

RELATED APPLICATIONS

The following related applications refer to the subject matter of this application:

U.S. Pat. application Ser. No. 07/617,238, filed Nov. 21, 1990

U.S. Pat. application Ser. No. 07/615,561 filed Nov. 19, 1990.

FIELD OF INVENTION

This invention relates inserter systems, and in particular to an automatic inserter machine capable of high speeds and increased reliability and flexibility.

BACKGROUND OF THE INVENTION

In the inserter field, it is known to have a modular inserter system wherein various types of modules can be combined to form inserter machines which meet the particular needs of each user. An example of a table top modular inserter system is described in U.S. Pa. No. 4,942,535, issued Jul. 17, 1990 to Robert J. Francisco and assigned to the assignee of the present invention. The types of modules which may be combined to form an inserter machine include, but are not limited to feeder, folder, accumulator and insert station modules.

An important feature of the modular inserter systems is a control system which is compatible to the modular concept. In U.S. Pat. No. 4,942,535, there is described a communication system for controlling a modular inserter. The communication system includes peer-to-peer communication whereby each module is controlled by its own microprocessor based on signals received from an adjacent module.

One important feature of a modular inserter system with each module having a microprocessor is that the various module types are combinable in virtually any order to form an inserter machine. As described in U.S. Pat. No. 4,942,535, once the modules are connected, the control system, through the microprocessors in each module, automatically determines the configuration and number of modules at start-up.

Another important feature of a modular table top inserter is the size or footprint of the inserter, which is directly dependent on the number and size of the modules being combined to form the inserter. Typically, the number of modules that make up an inserter machine determines the cost of the machine. For every feeder module included in an inserter, the size of the inserter is increased by the full size of the feeder module and the cost is increased by the hardware, assembly and software comprising the feeder module. Additionally, with each feeder module in the inserter the control system may be further burdened by another microprocessor added to the communication loop to control the feeder module.

SUMMARY OF THE INVENTION

It has been found that in an inserter the substitution of a submodule feeder in place of a feeder module provides a cost and size reduction as well as reducing the number of control processors required for the inserter.

It has been found that a self-contained, submodule feeder can be "piggybacked" to the first upstream module of a known table top inserter. This is accomplished by mounting the feeder submodule onto the module as the first upstream station of the inserter and preferably controlling the feeder submodule with the microprocessor of the first upstream module.

It has been discovered that the submodule feeder can be combined with any one of a variety of modules, e.g., a feeder module, folder module or inserter module, when such module is located as the first upstream module in the inserter system.

Accordingly, in a modular inserter system wherein customized inserter machines are configured by combining a plurality of modules, such modules including a variety of module types, for example, feeder, folder and insertion modules, each module containing a microprocessor for controlling the module as part of the control system for the customized inserter machine, the improvement comprising a first upstream module of the inserter machine, and a submodule feeder including means for coupling the submodule feeder to the upstream end of said first upstream module, wherein the submodule feeder performs operations of a feeder module under the control of the microprocessor of the first upstream module.

BRIEF DESCRIPTION OF THE DRAWINGS

Further features and advantages of the apparatus in accordance with the invention will be clearly seen and more easily understood from the description of the figures wherein.

DETAILED DESCRIPTION

Figure 1:
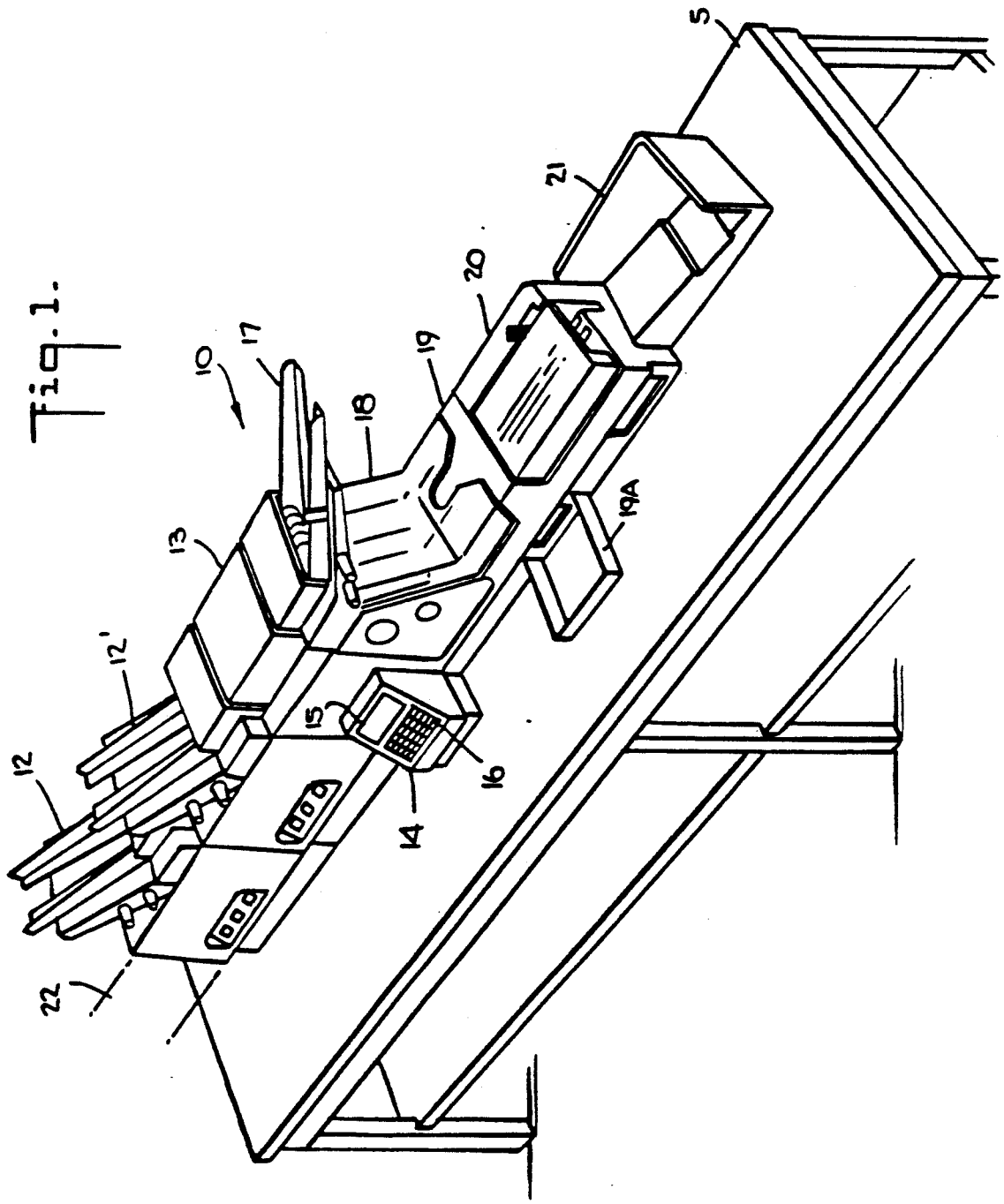
FIG. 1 is a perspective view of a modular table top inserter in which the present invention may be used.

Referring now to FIG. 1, there is shown a representative modular table top inserter 10 including two feeder modules 12 and 12' and a base module 13. The base module comprises an envelope feeder 17, insert station 18, envelope turner 19, moistener and sealer station 20 and storage bin 21. The broken lines designated 22 indicate that additional modules can be added to the inserter 10 as desired. Each module in the inserter 10 includes a microprocessor (not shown) which communicates with microprocessors in adjacent modules through a communication loop. Control panel 14 in base module 13 includes a display 15 and keyboard 16. For a more detailed description of such an inserter system reference is made to U.S. Pat. No. 4,942,535, supra.

A typical feeder module includes a feeder station, i.e. the apparatus mechanically performing the feed operation, in addition to an assortment of transport, drive and control mechanisms and also a microprocessor for controlling the feed station and the other mechanisms. It has been found that when the first upstream operation in an inserter is a feed operation, as in FIG. 1, a complete feeder module may not be necessary. The feeder module may be replaced by a submodule feeder which is "piggybacked" onto the upstream end of the first module. As used herein, the term "piggyback" means the submodule feeder is connected to the first upstream module such that the exit paper path of the submodule feeder feeds into the entrance paper path of the module.

Figure 2:
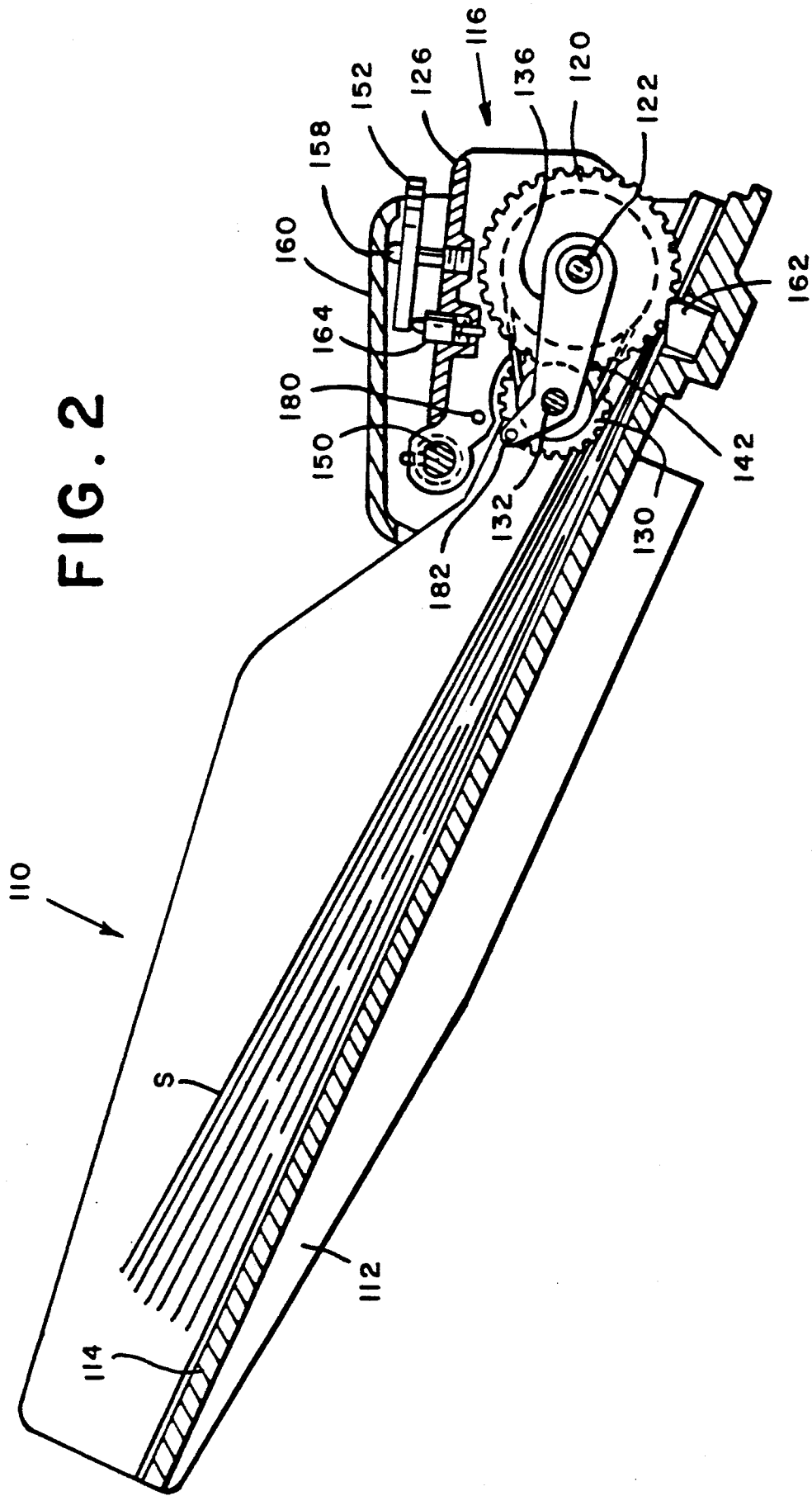
FIG. 2 is a side view of a submodule feeder which may be used in the present invention.

Referring now to FIG. 2, there is shown submodule feeder 110 having frame 112 and feed deck 114. Separator wheel assembly 116 includes separator wheel 120 and a plurality of prefeed wheels 130 mounted to housing 126. Indexing wheel 152 is used to adjust the bite between separator wheel 120 and separator stone 162. The separator wheel drive means (not shown) drives the separator wheel hub 121 which in turn drives the prefeed wheels 130 by means of timing belt 142 which is preferably independent of the transports and control means typically associated with a feeder module.

In the preferred embodiment of the present invention, the submodule feeder is a self-driven feeder An example of such a submodule feeder including a DC motor for directly driving the separator wheel assembly is described in detail in related U.S. Pat. application Ser. No. 07/612,238, filed concurrently herewith and assigned to the assignee of the present invention and incorporated herein by reference. A submodule feeder utilizing direct drive of the separator wheel assembly is most suitable for the present invention because such a feeder eliminates the mechanical drives which would typically be required to drive the piggybacked submodule feeder. It will be understood by those skilled in the art that other feeders which do not include a direct drive feature can be used as submodule feeders in the present invention, but may require additional mechanical drives, e.g. a belt driven feeder driven by a pulley and belt arrangement connected to the drive in module 12'.

As previously stated, the present invention is suitable for an inserter machine having a feed operation as the first upstream operation. In accordance with the present invention, a submodule feeder is used in place of a feeder module. Without affecting the performance or functions of the inserter, the present invention comprises a submodule feeder for performing the first upstream operation without many of the typical feeder module components, such as, transport arrangement, belts, gears and clutches for the motor drive arrangement, and microprocessor for controlling the module and communicating with the other modules in accordance with the control system of the inserter machine.

Figure 3:
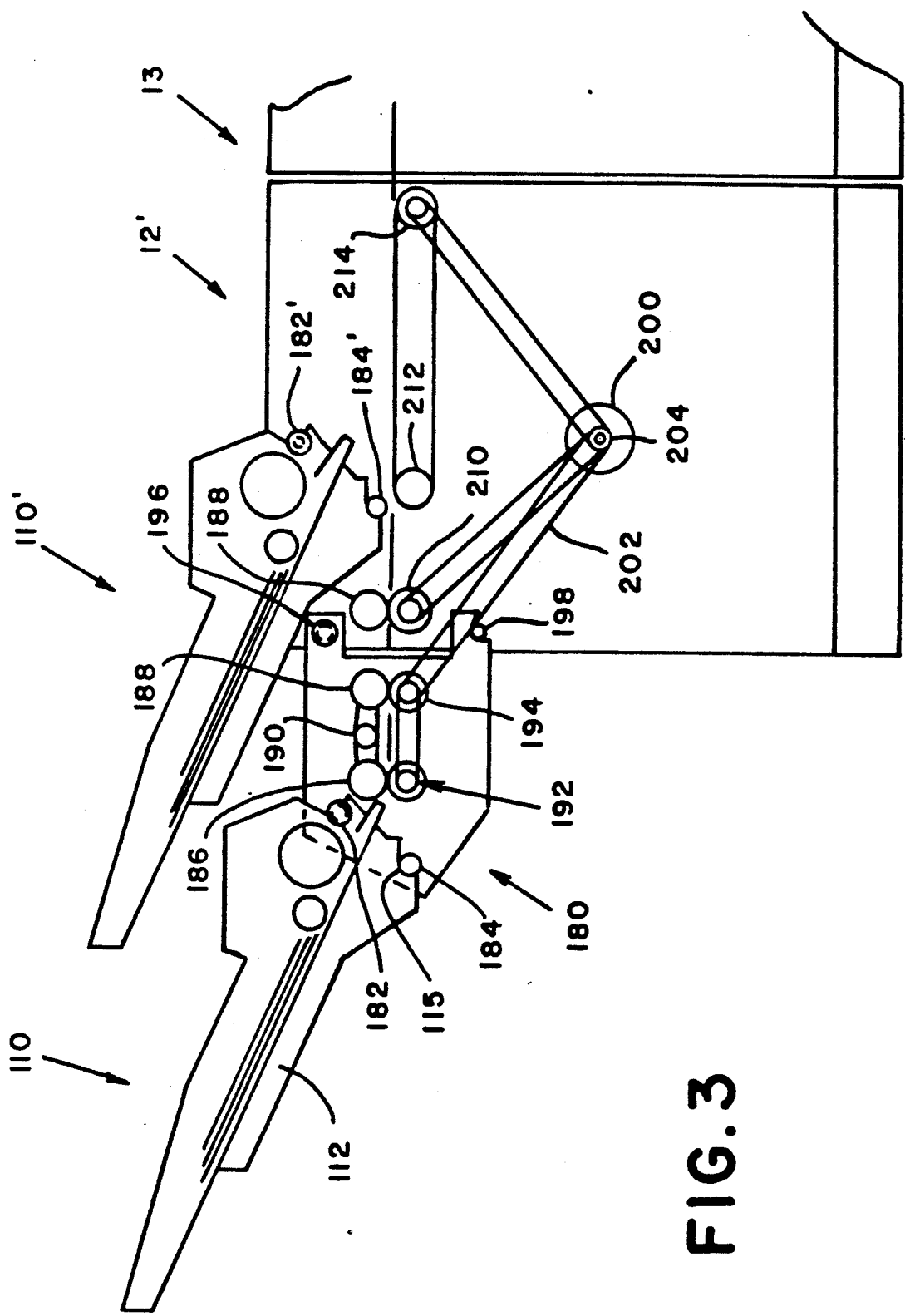
FIG. 3 is a side view of a first upstream module with a submodule feeder attached thereto.

Referring now to FIG. 3, the first upstream module is feeder module 12' shown with submodule 110 coupled to the module's upstream end in place of feeder module 12. In the preferred embodiment of the present invention, interface transport module 180 is interposed between the submodule feeder 110 and the module 12'. It has been found that such an interface or "mini" transport is advantageous when connecting a submodule feeder to a feeder module because it provides adequate spacing for operation and operator access between the submodule feeder 110 and the feed station 110' in feeder module 12'. Other arrangements to provide the same function will occur to one skilled in the art. For example, it will be appreciated by one skilled in the art that the submodule feeder 110 may be connected directly to other modules when the spacing of the submodule feeder is not required for operation or access. The connection directly to other modules may use a bolt and pin similar to the arrangement described below.

In the preferred embodiment of the present invention, the submodule feeder 110 is an identical unit to submodule feeder 110' which is part of module 12'. It has been found that using interchangeable submodule feeders for all feeding functions in the inserter machine simplifies set up and control procedures and requirements for spare parts. The interchangeability is achieved by having identical mounting arrangements for submodule feeders 110 and 110'.

As shown, in FIG. 3, submodule feeder 110 is mounted to mini transport 180 on each side by bolt 182 and supported by a bracket portion of the frame 115 mounted to pin 184. It can be seen that submodule feeder 110' is mounted by a similar bolt and pin arrangement (182' and 184', respectively). Mini transport 180 is mounted to module 12' on each side by bolt 196 and supported by bracket portion of the transport 180 mounted to pin 184.

An alternate method of using a base for mounting the mini transport to module 12' may be preferable when stability of the inserter machine is a concern. When a base (not shown) is attached below the mini transport 180, bolt 190 may be eliminated, thus freeing access to the transport path between the mini transport 180 and module 12'.

In the preferred embodiment of the present invention, the mini transport 180 comprises a set of upper and lower transport rollers suitably arranged to transport documents from submodule feeder 110 to feeder module 12'. The upper rollers 186 and 188 are idler rollers which are spring biased at 190 in order to accept various thicknesses of sheets. The lower rollers 192 and 194 are drive rollers preferably driven by motor 200 in module 12' by means of a belt 202 and pulley 204 arrangement. Preferably, the motor 200 also drives the transport rollers 210, 212 and 214 comprising the transport path in module 12'. For best results, the speed of the mini transport 180 is the same as the speed of the transport along the path in module 12', which is faster than the transport speed of sheets from the submodule feeders 110 and 110'.

The microprocessor of module 12' (not shown) is programmed to recognize when submodule feeder 110 is mechanically and electrically connected as an end station, whereby the microprocessor of module 12' controls the submodule feeder 12 as the first station in the inserter 10. From the operator's perspective, the inserter machine having a submodule feeder 110 as the first feed station operates and performs the same as an inserter machine having a feeder module as the first feed station.

Figure 4:
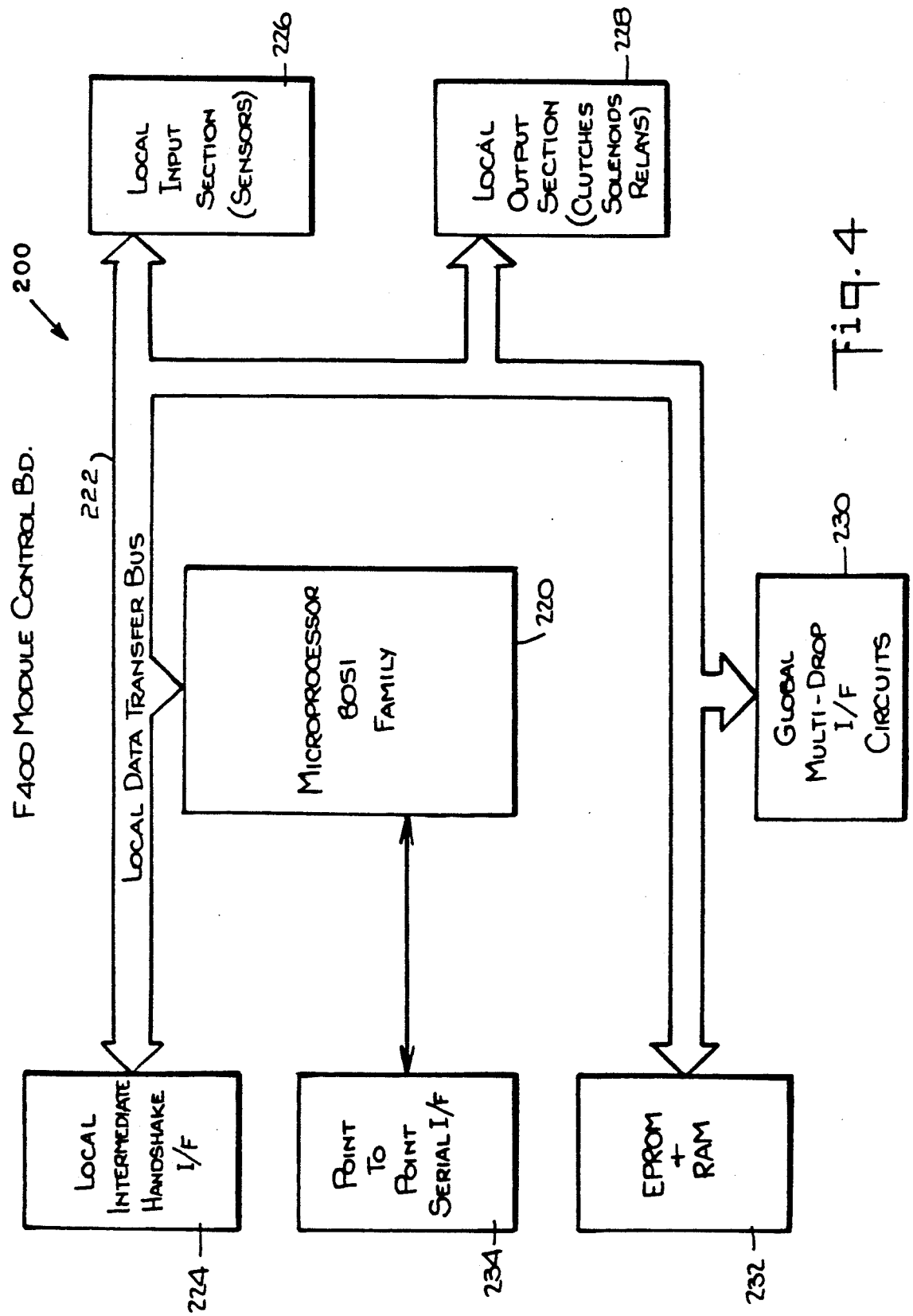
FIG. 4 is a block diagram of a microprocessor employed in each of the modules in the inserter of FIG. 1.

Referring now to FIG. 4, a diagram of the microprocessor in each of modules 12' and 12 is illustrated. Each individual module of inserter 10 is controlled by a local controller, such as the microprocessor 220, which is preferably of the Intel 8051 family, coupled to a local data transfer bus 222 receiving local intermodule handshake signals through the local module handshake interface buffer 224. Local data transfer bus 222 also receives signals from the local input section 226 which includes the document position sensors, local keyboard input, and other input devices. The data transfer bus also provides output signals from the microprocessor 220 to the local output section 228 for controlling electromechanical components contained within the module such as motion clutches for driving the transports, solenoids for disabling the drive motors and activating the queuing stations, and relays for activating status lights and other power functions. Block 232 includes EPROM for program storage for local program control and RAM for temporary storage which are also coupled to the microprocessor local data transport bus 222 in a conventional manner. Microprocessor 220 also receives the signals derived from the point to point serial interface bus through buffer 234.

In accordance with the preferred embodiment of the present invention, when submodule feeder 110 is used in place of module 12, the microprocessor 200 controlling module 12 is eliminated and the microprocessor 200 of module 12' is programmed to control submodule feeder 110 in addition to controlling module 12. Submodule feeder 110, including sensors mounted therein, becomes another input device to local input section 226 and another output device to local output section 228. In this manner, microprocessor 200 of module 12' controls submodule feeder 110 as if submodule feeder were part of module 12'.

It will be appreciated by those skilled in the art that there has now been described a novel piggyback feeder arrangement for an inserter which provides a submodule feeder as the first feed station in a modular inserter system. While this invention has been described in conjunction with specific embodiments thereof, many alternatives, modifications and variations will be apparent to those skilled in the art. Accordingly, it is intended to embrace all such alternatives, modifications and variations that follow within the spirit and scope of the appended claims.

What is claimed is:

1. In a modular inserter system wherein customized inserter machines are configured by combining a plurality of modules, such modules including a variety of module types, for example, feeder, folder and insertion modules, each module including a microprocessor for controlling the module, the improvement comprising:
   a first upstream module of the inserter machine; and
   a submodule feeder including means for coupling said submodule feeder to the upstream end of said first upstream module, wherein said submodule feeder performs operations of a feeder module under the control of said microprocessor within said first upstream module.

2. The improvement of claim 1, wherein said submodule feeder is connected to one end of an interface transport, the other end of said interface transport being connected to said upstream end of said first upstream module.

3. The improvement of claim 1, wherein said coupling means includes an interface transport whereby said submodule feeder is connected to one end of an interface transport, the other end of said interface transport being connected to said transport portal of said first upstream module.

4. In a module inserter system wherein customized inserter machines are configured by combining a plurality of modules, such modules including a variety of module types, for example feeders, folders and insertion modules, each module including a microprocessor for controlling the module, each module including a transport portal located at the upstream end of the module for connecting another module, the improvement comprising:
   a first upstream module of the inserter machine;
   a submodule feeder adjacent said first upstream module; and
   means for coupling said submodule feeder to said transport portal of said first upstream module wherein said microprocessor of said first upstream module controls said feeder in addition to controlling said first upstream module.

5. In a modular inserter system wherein customized inserter machines are configured by combining a plurality of modules, such modules including a variety of module types, for example, feeder, folder and insertion modules, each module including a microprocessor for controlling the module, the improvement comprising:
   a module capable of being positioned as a first upstream module in the inserter machine, said module including means for accepting a submodule feeder at the upstream end of said module.

6. The improvement of claim 5, wherein said means for accepting said submodule feeder includes the capability of controlling the operation of said submodule feeder by a microprocessor internal to said module.

7. In a modular inserter system wherein customized inserter machines are configured by combining a plurality of modules, such modules including a variety of module types, for example, feeder, folder and insertion modules, each module including a microprocessor for controlling the module, the improvement comprising:
   a submodule feeder including means for coupling said submodule feeder to a first upstream module of the inserter machine at the upstream end of said first upstream module.

8. The improvement of claim 7, wherein said mean for coupling includes the capability of the operation of said submodule feeder being controlled by a microprocessor internal to said first upstream module.

9. In a modular insertion system wherein customized inserter machines are configured by combining a plurality of modules, such modules including a variety of module types, for example feeders, folders and insertion modules, each module including a microprocessor for controlling the module, each module including a transport portal located at the upstream end of the module of connecting another module, a method of replacing a feeder module when the feeder module would be the first upstream module in the inserter machine, the method comprising the steps of:
   providing a submodule feeder which contains the essential elements required for the mechanical portion of the feeding function;
   coupling said submodule feeder to the first upstream module of the inserter machine;
   controlling said submodule feeder by the microprocessor internal of the first upstream module.

* * * * *